United States Patent [19]

Bruun

[11] 4,114,666
[45] Sep. 19, 1978

[54] METHOD OF FOREST HARVESTING AND A MACHINE FOR PERFORMING SAID METHOD

[75] Inventor: Lars Öjvind Bruun, Filipstad, Sweden

[73] Assignee: Volvo BM AB, Eskilstuna, Sweden

[21] Appl. No.: 695,570

[22] Filed: Jun. 14, 1976

[30] Foreign Application Priority Data

Jun. 27, 1975 [SE] Sweden ............................. 7507407

[51] Int. Cl.² ............................................. A01G 23/08
[52] U.S. Cl. .............................. 144/309 AC; 144/2 Z; 144/3 D
[58] Field of Search ................... 144/2 Z, 3 D, 34 R, 144/34 E, 34 B, 309 AC

[56] References Cited

U.S. PATENT DOCUMENTS

| | | | |
|---|---|---|---|
| 3,464,468 | 9/1969 | Thompson et al. | 144/3 D |
| 3,620,272 | 11/1971 | Eriksson | 144/3 D |
| 3,708,000 | 1/1973 | Duffty et al. | 144/3 D |
| 3,763,905 | 10/1973 | Hamilton et al. | 144/3 D |
| 3,939,886 | 7/1976 | Tucek | 144/3 D |

*Primary Examiner*—Gil Weidenfeld
*Assistant Examiner*—W. D. Bray
*Attorney, Agent, or Firm*—Young & Thompson

[57] ABSTRACT

A method of felling and processing trees with a machine with a boom swingable about a vertical axis at the front end of the machine. The boom is extended in front of the machine and a tree is gripped and cut. The boom is swung while holding the tree vertical to a rearwards position, where the tree is lowered with the top to the rear. The root end is introduced into the rear-facing feed end of a processing unit on the machine. During processing, the tree is fed in the direction towards the front end of the machine.

9 Claims, 2 Drawing Figures

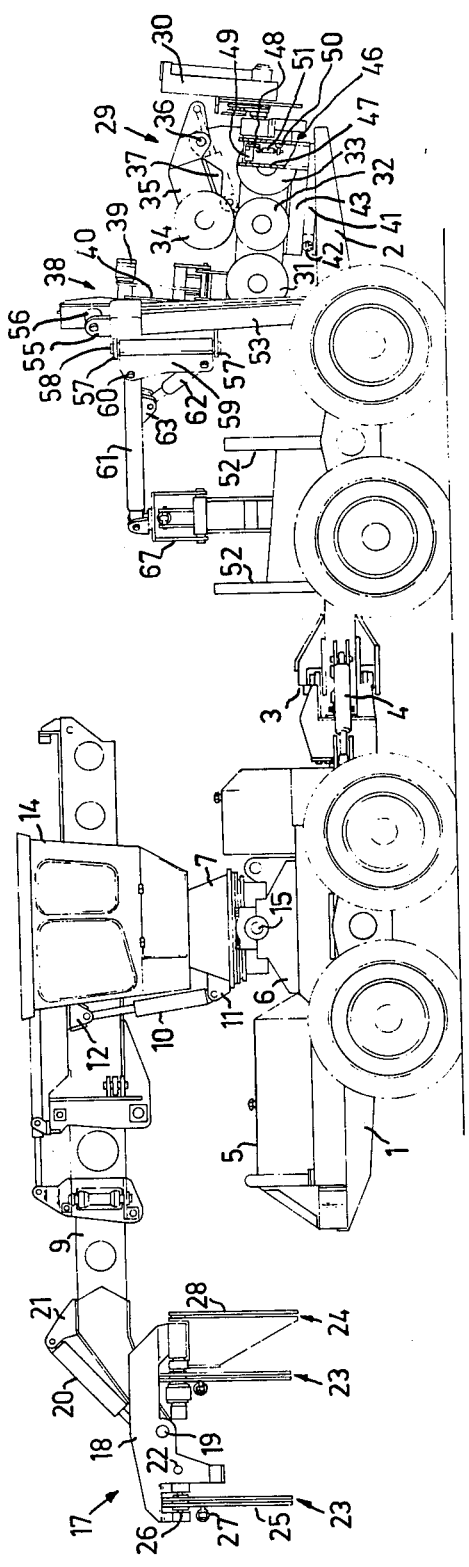
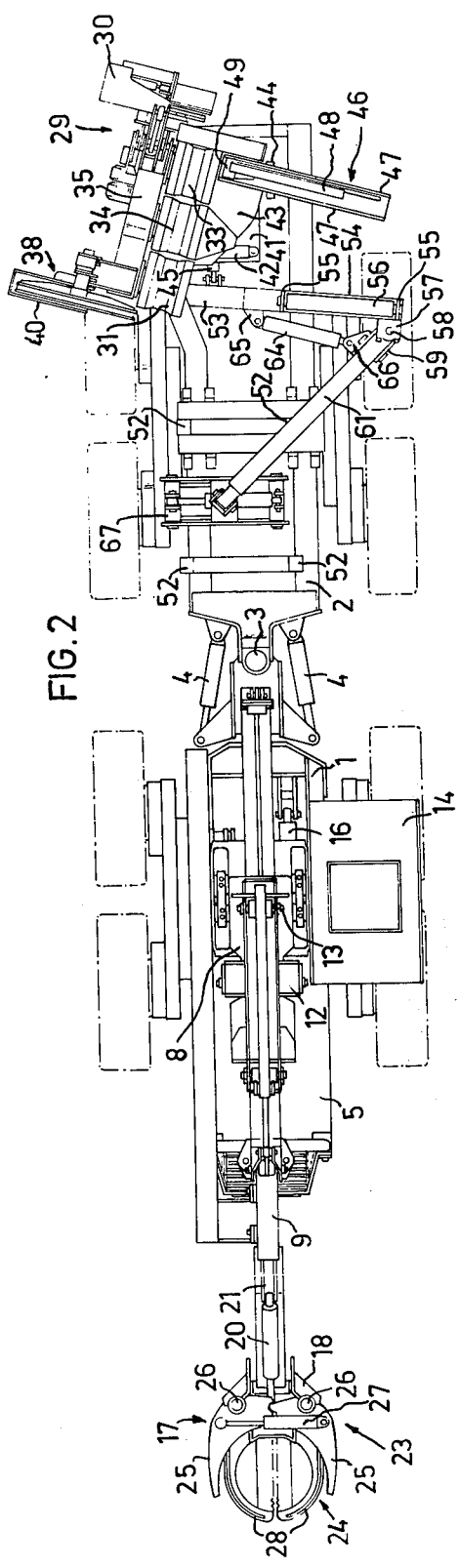

METHOD OF FOREST HARVESTING AND A MACHINE FOR PERFORMING SAID METHOD

The present invention relates to a method of felling standing trees and processing the felled trees with the help of a vehicle with, on the one hand, an extendable and retractable boom with means for gripping, cutting and felling standing trees and, on the other hand, a processing device. The vehicle is driven to a stand of trees, the boom extended and the tree gripped, cut and lowered and then fed into the processing device.

In previously known methods of forest harvesting with the help of vehicle-mounted forest harvesters according to the method described above the tree was cut and lowered, whereafter the tree was drawn in towards the vehicle and fed into the feed end of the processing device located beside or under the boom. The processing was then done as the tree was fed backward on the vehicle.

The intention of the present invention is to further develop a method and a machine for forest harvesting, so that the cutting can be done more quickly without requiring more complicated machinery. According to the invention this is achieved with a method which is characterized in that after the tree has been gripped and cut the boom is drawn in and swung around an axis at the front end of the vehicle, with the tree still standing vertically, to a position reaching essentially towards the opposite, rear end of the vehicle, where the tree is lowered along essentially the continuation of the boom with the top directed backwards from the vehicle, that the root end of the tree is introduced into the rear-facing feed end of the processing device, and that the tree is processed while it is advanced essentially from the rear of the vehicle to the front.

The primary advantage of this method is that the just cut tree does not need to be lowered into the stand of trees, but rather it is swung around still in the vertical position to be lowered only after it has been carried to the rear end of the vehicle. The tree is now lowered backwards from the vehicle into the free area which has already been cut. This results in the further advantage that the pile of limbs and branches formed next to the feed end of the processing device and the delimbing means will end up behind the vehicle in the method according to the invention, and therefore the vehicle will not need to pass through them. In previously known methods the piles of limbs and branches were formed in front of the vehicle so that the vehicle had to climb over the piles to move to the next cutting location.

According to a preferred further development of the invention a processing device is used which is swingable around a vertical axis, whereby during a first processing phase, in which the processing device assumes a first position at an angle to the longitudinal axis of the rear vehicle section, processed trees are fed out in cut or whole lengths over one side of the vehicle, whereafter the device swings so that its delivery end is directed to a hopper located in front of the same on the vehicle, and processed cut trees are then fed to the hopper during a second processing phase.

During the first processing phase timber can be delivered over one side of the vehicle into piles beside the vehicle. Small dimension pieces towards the top of the tree are cut into pulp wood logs and are fed during the second processing phase into the hopper on the vehicle. The vehicle is suitably provided with a grapple crane which grasps a bundle of pulpwood when the hopper is filled and lays the bundle on the opposite side of the vehicle to where the timber was delivered. When small-dimension trees are cut the first processing phase can be skipped and the trees can be cut directly into pulp wood lengths, which are fed into the hopper.

The invention also relates to a forest harvester for performing the process described above. A forest harvester comprising a vehicle with, on the one hand, an extendable and retractable boom, swingable around a vertical axis, and provided with an arrangement for gripping, cutting and lowering standing trees and, on the other hand, a processing device with delimbing means, feeding means and suitably also cutting means for processing trees delivered to the device by means of the boom, is characterized according to the invention in that the boom's vertical swing axis is located at the front end of the vehicle and that the processing device is located at the opposite rear end of the vehicle with its feed end facing backward from the vehicle.

A vehicle of this type is more advanced than a forest harvester vehicle of previously known design in that the boom in normal operation makes large swing movements (on the average about 180°) with the tree still standing vertically. This requires, for example, precision automatic levelling equipment to keep the boom's swing axle vertical. Thus the design according to the invention involves increased costs, but these are more than compensated for by the increased cutting capacity of the machine.

Further advantages and characteristics of the invention are given below in the description of a forest harvester according to the invention with reference to the accompanying drawing, in which FIG. 1 shows the forest harvester from the side and FIG. 2 shows it from above.

The forest harvester according to the invention is constructed as a wheel-mounted vehicle with articulated frame steering, including a front vehicle frame 1 and a rear vehicle frame 2, which are swingably connected with each other by a vertical axle 3. Steering of the vehicle is accomplished by the front and rear sections swinging in relation to one another by means of hydraulic steering cylinders 4 mounted at the axle 3.

The front vehicle section 1 carries the engine 5 and a mounting 6 for a turntable 7 with its vertical axle on the longitudinal center line of vehicle section 1. The turntable 7 in turn carries the mounting 8 for a telescopically extendable and retractable boom 9. A hydraulic cylinder 10 is disposed between a bracket 11 on the turntable 7 and a bracket 12 on the telescopic boom 9 to swing the telescopic boom 9 vertically around a transverse horizontal axle 13, FIG. 2. The construction of the telescopic boom can be any well known.

An operator's cab 14 is carried by the turntable 7 beside the boom mounting 8. The turntable 7 is provided with automatic levelling equipment (not shown here in detail) to keep the turntable axle vertical during the operation of the telescopic boom. Thus the turntable 7 is mounted on a transverse, in relation to the front section 1, essentially horizontal axle 15 (FIG. 1) and can be tilted ±15° around said axle with the help of a hydraulic tilt cylinder 16, mounted between the under portion of the turntable and vehicle frame 1 (FIG. 2). To allow for levelling movement by swinging in a transverse plane to the longitudinal axis of the vehicle, the transverse axle 15 is vertically displaceable at its right end together with its bearing, by means of a hydraulic cylinder (not shown), so that the turntable 7 can be tilted ±8° transverse to the vehicle. The levelling is done automatically with the help of electrical sensors which control the valves for the hydraulic cylinders.

The telescopic boom 9 carries at its front end a tree feller unit 17. This comprises a frame 18 which is swingably connected to the end of the boom 9 through a transverse horizontal axle 19. The frame 18 can be swung between the horizontal position shown in FIG. 1 and the vertical position shown in FIG. 2 with the help of a hydraulic cylinder 20, one end of which is pivotally connected to a bracket 21 on the boom and whose piston-rod is swingably connected to a transverse axle 22 in the frame 18 (FIG. 1). Two grippers 23 and a cutter 24 are arranged in line with one another on the frame 18. Each gripper 23 has two claws 25 which can swing around axles 26 parallel to the longitudinal direction of the frame 18. The claws 25 are operated with the help of a hydraulic cylinder 27 mounted between the same. The cutter is, for example, constructed in accordance with Swedish Patent Specification No. 330,602 and comprises a pair of chain saw bars 28, swingable towards and away from each other, which guide motor-driven saw chains. The tree feller unit 17 can be of a type which is well known.

The rear vehicle section 2 is provided with a processing device 29 which can also be of a type which is well known, and includes delimbing means 30 at its feed end facing back from the vehicle, for example in the form of delimbing chains, which by means of arms can be wrapped around a tree to delimb it as the tree moves through the device 29. The processing device 29 is provided with feed means for feeding a tree through the device essentially from the back towards the front of the vehicle. In the embodiment shown the feed means includes four feed rolls 31-34, three of which 31-33 are mounted on fixed axles in the device 29 and form a feed path, above which the fourth feed roll 34 is mounted on an arm 35 which is swingable around a transverse horizontal axle 36 with the help of a hydraulic cylinder 37. The front and rear lower rolls 31 and 33 respectively as well as the upper roll 34 are constructed as double conical rolls and all are driven. The intermediate lower roll 32 is cylindrical. This roll can also be driven. In front of the feed rolls the processing device 29 is provided with cutting means 38 in the form of a circular saw 40 powered by a hydraulic motor 39, which saw, by means of a hydraulic cylinder (not shown) can be swung, from a rest position on the side of the feed path for a tree through the feed rolls 31-34, in towards a tree which is momentarily held stationary by the feed rolls to cut off a stem length extending in front of the feed means.

The processing device 29 can be swung as a unit in relation to the rear vehicle section 2 and is shown in FIG. 1 tilted backward and oriented along the longitudinal axis of the vehicle. FIG. 2 shows the processing device 29 positioned at an angle to the longitudinal axis of the vehicle so that the logs which are fed out will end up beside the right side of the vehicle. The processing device 29 is swingable around a vertical axle (not shown) in relation to a separate bottom plate 41. The swing motion is achieved with the help of an essentially horizontal hydraulic cylinder 42, mounted transversely, one end of which is attached to the bottom plate 41 and whose piston rod is attached to the frame 43 of the processing device 29. The bottom plate 41 is in turn swingable around a transverse horizontal axle (not shown) which is journalled in the vehicle frame 2. The left axle bearing is designated 44 in FIG. 2. The tilting of the processing device 29 around this axle is achieved by means of a hydraulic cylinder 45, one end of which is attached to the vehicle frame 2 in front of the bottom plate 41 and whose piston rod is attached to the bottom plate.

According to the invention the processing device 29 is provided with a feed bridge 46 which extends out to the left at right angles to the feed direction of the feed rolls at the front portion of the first feed roll 33. The feed bridge 46 includes two essentially vertical parallel bracket plates 47, whose upper edges lie in a common plane parallel to the feed direction of the feed rolls and situated level with the upper part of the circumferential surface of the first feed roll 33. An injector arm 48 is arranged between the bracket plates 47, which is swingable around an axle 49 which extends between the bracket plates 47 at their inner upper ends. FIG. 1 shows the feed bridge 46 seen partially in section from its outer end. A hydraulic cylinder 51 is articulated to a mounting 50 on one of the bracket plates, and the piston rod is articulated to the injector arm 48. In its rest position the injector arm 48 extends essentially parallel to and level with the upper edges of the bracket plates 47. With the help of the hydraulic cylinder 51 the injector arm 48 can be swung around the axle 49 so that its outer end is raised and it moves a tree resting on the bridge 46 in between the lower feed rolls 31-33 and the upper feed roll 34, which in this phase is held raised by the arm 35.

Two pairs of vertical posts 52 are arranged side by side in front of the processing device 29 on the rear vehicle section 2, which together form a collection hopper for logs fed forward from the processing device 29. A vertical standing bracket 33, extending over the left side of the vehicle, is mounted on the rear vehicle section, with an upper essentially horizontal arm 54. A roll 56 is rotatably journalled on the same between a pair of erect flanges 55. The roll 56 forms a support for the boom 9 when it has been swung to its backward position and the tree is to be lowered.

A pair of horizontal mounting plates 57 extend from the front side of the bracket 53, for a vertical axle 58, around which a crane arm mounting 59 is swingably journalled. The crane arm mounting 59 has a horizontal axle 60, around which a crane arm 61 can swing with the help of a hydraulic cylinder 62, one end of which is connected to the crane arm mounting 59 and whose piston rod is attached to a bracket 63 on the underside of the crane arm 61. The crane arm mounting 59 can be swung around the axle 58 with the help of a hydraulic cylinder 64 which operates between a point of attachment 65 on the bracket 53 and a point of attachment 66 on the crane arm mounting 59. The crane arm 61 carries a grapple 67 which is known per se and with the help of which logs collected in the hopper 52 can be grasped and lifted from the vehicle and placed on the ground to the left of the vehicle.

The forest harvester described above operates in the following manner.

The vehicle is driven up to a stand of trees and stops immediately in front of the same. The operator engages the automatic levelling equipment so that the axle for the boom's turntable is vertical. Then the boom 9 is extended with the tree feller unit in the vertical position, i.e. with the cutter 24 on the bottom and the two grippers 23 vertically above the cutter. The tree is gripped with the grippers 23 and is cut by the cutter 24. The boom 9 is now lifted by means of the hydraulic cylinder 10 so that the tree can be moved freely over the ground. The boom 9 is retracted and swung backwards until it is pointed over the roll 56 of the crane arm support. The boom is lowered so that it rests on the roll 56, whereafter the tree feller unit 17 is swung into its horizontal position, thereby lowering the tree essentially backwards from the vehicle. The grippers 23 then release the root end of the tree, which falls onto the feeder bridge 46. With the help of the injector arm 48 the root end of the tree is moved into the feed means of the processing device 29, e.g. between the lower feed rolls 31–33 and the previously raised upper feed roll 34. The arm 35 with the upper feed roll 34 is then lowered. The delimbing means 30 are also brought into position around the tree. The feed rolls then start and feed the tree through the processing device from its rearfacing feed end forwards essentially along the length of the vehicle. During a first processing phase, where the thicker portion of the tree is processed, the processing device 29 is held in the position shown in FIG. 2, where it forms a small angle with the longitudinal axis of the vehicle and it delivers delimbed and cut logs, cut by the cutter 38, over the right side of the vehicle, where the logs are left to lie in piles to be picked up later. When the portion of the tree which is usable for timber has been used up, the processing device 29 is swung to a position parallel to the longitudinal axis of the vehicle, whereafter the remaining cut logs are fed for collection into the hopper formed by the posts 52.

During this time a tree is being processed in the device 29, the operator has swung the boom 9 forward and extended it to grip and cut a new tree, which is swung in vertical position back and is in turn lowered backwards and placed on the feed bridge 46. The tree can rest on the feed bridge until the device has finished processing the previous tree, whereafter the injector arm 48 moves the new tree into the feed position.

The machine is provided with a hard-programmed computerized control system, which controls the processing device 29 and possible additional equipment. When the operator has placed a tree on the feed bridge 46 he sends a signal or data concerning the tree to the computer system, which then automatically controls the processing. The operator is thus completely free to concentrate on gripping and felling the next tree.

When the hopper 52, intended primarily for collecting pulp wood, has been filled the grapple 67 is swung by means of the crane arm 61 over the hopper 52 and it grasps the logs collected therein and lifts them out over the left side of the vehicle and lays them on the ground beside the vehicle. In spite of its relatively short length the crane arm 61 is able to place the bundle of pulp wood well to the side of the vehicle since the swing axle 58 of the crane arm is displaced to the side of the center line of the vehicle.

When small dimension trees are harvested and used entirely for pulp wood the processing device 29 is first placed in its angular position shown in FIG. 2, and a tree is then placed on the feed bridge 46. After the tree has been moved to the feed position by the injector arm 48 and has been grasped by the feed roller, the processing device, while holding the tree fast, swings into its position parallel to the vehicle for delivery of logs to the pulp wood hopper 52. The swinging of the processing device 29 around the horizontal axis can be done by the operator after the vehicle has been positoned to adapt the inclination of the device to the inclination which a tree has when its crown rests on the ground and its root end rests on the feed bridge 46. The processing device 29 can alternatively be tilted automatically for adaption to the inclination of the tree.

Due to the fact that the trees are not felled forward or to the sides into the remaining stand of trees, but are drawn in towards the vehicle, swung around still in vertical position and lowered backwards from the vehicle, there are none of the problems which are associated with the felling of trees in a stand of trees. By processing the trees while moving them from the back and forwards, with the delimbing means situated at the very rear of the vehicle, the collected piles of branches will not create an obstacle when the vehicle is driven forward to the next cutting location. Furthermore the invention provides the additional advantage that the operator has an excellent opportunity to inspect the root end of the tree for possible root rot and can thereby quickly determine the merchantable timber length.

What I claim is:

1. A method for felling standing trees and cutting portions from the felled trees, utilizing a vehicle having a front end and a rear end and an extendable and retractable boom which has means for gripping, cutting and lowering standing trees, the vehicle further having a delimbing device at the rear end thereof, the boom being rotatable independently of the delimbing device around a substantially vertical axis at the vehicle front end, the method comprising driving the vehicle forward up to a stand of trees, extending the boom substantially over the front end of the vehicle toward a tree, gripping the tree with the boom, cutting the tree, then retracting the boom and swinging the boom around its substantially vertical axis, with the severed tree stem held substantially vertically, to a position where the boom is pointing substantially over the rear end of the vehicle, then lowering the tree substantially in the longitudinal direction of the boom with the tree top directed backward away from the vehicle, introducing the root end of the tree into the delimbing device, and delimbing the tree while advancing the tree from the rear end of the vehicle toward the front end thereof, and during a first phase in which the delimbing device assumes a first position at an angle to the longitudinal axis of the rear vehicle section, feeding delimibed logs out in cut or whole lengths over one side of the vehicle, then swinging the device so that its delivery end is directed to a hopper located between the delimbing device and the vehicle front end, and then feeding cut logs to the hopper during a second phase.

2. A method as claimed in claim 1, and feeding cut logs out from the delimbing device to a hopper located in front of said device on the vehicle.

3. A method as claimed in claim 1, and grasping logs collected in the hopper by means of a grapple carried by a crane arm on the vehicle and swinging these logs out and unloading them by means of the crane arm over the opposite side of the vehicle to where the logs were delivered during said first phase.

4. Forest harvesting machine, comprising a vehicle having an extendable and retractable boom swingable around a vertical axis and provided with an arrangement for gripping, cutting and lowering standing trees, and also having a device with delimbing means, and feeding means for trees brought by the boom to the device, characterized in that the boom's vertical swing axis is located at the front end of the vehicle and that the delimbing device is located at the opposite, rear end of the vehicle and has a feed end facing backward from the vehicle and that the boom is swingable independently of the delimbing device, the vehicle having a hopper between the swing axis of the boom and the delimbing device, said delimbing device being swingable around a vertical axis between one position in which the feed direction of the device forms an angle with the longitudinal axis of the rear vehicle section so that delimbed logs are delivered beside the vehicle, and another position in which cut logs are fed to the hopper.

5. A machine as claimed in claim 4, the vehicle having a crane arm with a grapple, means mounting said crane arm swingably on the vehicle about a vertical axis, said axis of the crane arm being displaced laterally out from the centerline of the vehicle toward the side opposite the side over which the delimbing device delivers logs in said one position, said grapple being adapted to grasp logs collected in the hopper and by means of the crane arm to swing out over the side of the vehicle closest to the swing axis of the crane arm for discharging the grasped logs.

6. A machine as claimed in claim 4, the vehicle having a support for the boom which is located beside the delimbing device and at a higher level than the feed end of the delimbing device.

7. A machine as claimed in claim 6, said support comprising a bracket extending laterally from the centerline of the vehicle, said bracket carrying the swing axis of the crane arm.

8. A machine as claimed in claim 4, said delimbing device having a laterally extending feed bridge disposed to carry the root end of a tree laid thereupon by means of the boom, said bridge having means for laterally feeding the end of the tree into the feed end of the delimbing device.

9. A machine as claimed in claim 8, and an injector arm that extends along said feed bridge, the outer end of said injector arm being adapted to be raised to move the end of the tree in toward the feed end of the delimbing device.

* * * * *